(12) United States Patent
Kim et al.

(10) Patent No.: US 11,532,262 B2
(45) Date of Patent: Dec. 20, 2022

(54) DISPLAY PANEL DRIVER, SOURCE DRIVER, AND DISPLAY DEVICE INCLUDING THE SOURCE DRIVER

(71) Applicant: SAMSUNG ELECTRONICS CO., LTD., Suwon-si (KR)

(72) Inventors: Jung Moon Kim, Namyangju-si (KR); In-Suk Kim, Suwon-si (KR); Chan Bong Yu, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 83 days.

(21) Appl. No.: 17/030,912

(22) Filed: Sep. 24, 2020

(65) Prior Publication Data

US 2021/0264844 A1 Aug. 26, 2021

(30) Foreign Application Priority Data

Feb. 26, 2020 (KR) ........................ 10-2020-0023406

(51) Int. Cl.
*G09G 3/20* (2006.01)
*G06F 7/74* (2006.01)

(52) U.S. Cl.
CPC ............. *G09G 3/2092* (2013.01); *G06F 7/74* (2013.01); *G09G 2310/0289* (2013.01); *G09G 2320/0276* (2013.01)

(58) Field of Classification Search
CPC ......... G09G 2310/0289; G09G 3/2092; G09G 2320/0276; G09G 3/3685; G09G 2310/0275; G09G 3/3275; G09G 3/007; G09G 5/001; G09G 2300/0828; G06F 7/74

See application file for complete search history.

(56) References Cited

U.S. PATENT DOCUMENTS

| | | | |
|---|---|---|---|
| 7,737,933 B2 | 6/2010 | Yamano et al. |
| 8,094,114 B2 | 1/2012 | Chuang |
| 8,164,556 B2 | 4/2012 | Song et al. |
| 8,269,708 B2 | 9/2012 | Tahata |
| 10,290,253 B2 | 5/2019 | Inoue et al. |
| 10,311,825 B2 | 6/2019 | Ludden et al. |
| 2003/0076282 A1 | 4/2003 | Ikeda et al. |

(Continued)

FOREIGN PATENT DOCUMENTS

KR 1020160083377 7/2016

*Primary Examiner* — Roberto W Flores
(74) *Attorney, Agent, or Firm* — F. Chau & Associates, LLC

(57) ABSTRACT

A display driver includes first and second level shifters, respectively receiving a digital signal's most significant bit (MSB) and the digital signal's non-MSB. The first level shifter includes a first input terminal, a first output terminal via which a signal input to the first input terminal is output, a second input terminal, and a second output terminal via which a signal input to the second input terminal is output. The second level shifter includes a third input terminal, a third output terminal via which a signal input to the third input terminal is output, a fourth input terminal, and a fourth output terminal via which a signal input to the fourth input terminal is output. The first input terminal receives an inverted MSB, the second input terminal receives the MSB, the third input terminal receives the non-MSB, and the fourth input terminal receives the inverted non-MSB.

19 Claims, 13 Drawing Sheets

(56) References Cited

U.S. PATENT DOCUMENTS

| | | | |
|---|---|---|---|
| 2005/0001798 A1* | 1/2005 | Nohtomi | G09G 3/3688 345/87 |
| 2009/0015603 A1* | 1/2009 | Yanai | G09G 3/3688 345/89 |
| 2009/0040149 A1* | 2/2009 | Nishinohara | G11C 19/00 345/76 |
| 2009/0284512 A1* | 11/2009 | Fan | G09G 3/3696 341/144 |
| 2010/0141636 A1* | 6/2010 | Marsanne | G09G 3/36 345/213 |
| 2018/0342210 A1* | 11/2018 | Choi | H03M 1/76 |

\* cited by examiner

Fig. 10

| 112 | MSB | Non-MSB | Binary | Decimal | 112 | MSB | Non-MSB | Binary | Decimal |
| --- | --- | --- | --- | --- | --- | --- | --- | --- | --- |
| | | | DD<7:0> | | | | | DD<7:0> | |
| Before t1 | 0 | 1 | 01111111 | 127 | Before t1 | 1 | 0 | 10000000 | 128 |
| T1 | 1 | 0 | 10000000 | 128 | T1 | 1 | 0 | 10000000 | 128 |
| After t1' | 1 | 0 | 10000000 | 128 | After t1' | 0 | 1 | 01111111 | 127 |

| Non-Swap | MSB | Non-MSB | Binary | Decimal | Non-Swap | MSB | Non-MSB | Binary | Decimal |
| --- | --- | --- | --- | --- | --- | --- | --- | --- | --- |
| | | | DD<7:0> | | | | | DD<7:0> | |
| Before t1 | 0 | 1 | 01111111 | 127 | Before t1 | 1 | 0 | 01111111 | 128 |
| T1 | 0 | 0 | 00000000 | 0 | T1 | 0 | 0 | 00000000 | 0 |
| After t1' | 1 | 0 | 10000000 | 128 | After t1' | 0 | 1 | 10000000 | 127 |

Fig. 13

| glitch(mV) | Ref. | Case-7 | Case-75 | Case-753 | Case-7531 |
|---|---|---|---|---|---|
| 127→128(Decimal) | 53 | 0 | 7 | 7 | 7 |
| 128→127(Decimal) | 37 | 21 | 17 | 19 | 19 |
| 63→64(Decimal) | 43 | 43 | 29 | 23 | 23 |
| 64→63(Decimal) | 7 | 7 | 0 | 0 | 0 |
| MAX | 53 (100%) | 43 | 29 | 23 | 23 (43%) |
| AVG | 35 (100%) | 18 | 13 | 12 | 12 (34%) |

DISPLAY PANEL DRIVER, SOURCE DRIVER, AND DISPLAY DEVICE INCLUDING THE SOURCE DRIVER

CROSS-REFERENCE TO RELATED APPLICATIONS

This application claims priority under 35 U.S.C. § 119 to Korean Patent Application No. 10-2020-0023406, filed on Feb. 26, 2020, the disclosure of which is incorporated by reference herein in its entirety.

TECHNICAL FIELD

Exemplary embodiments of the present disclosure relate to a display panel driver, a source driver, and a display device including the source driver.

DISCUSSION OF THE RELATED ART

Display driver integrated circuits (ICs) (DDIs) drive various screen patterns. It is typically desired that mobile DDIs (MDDIs) have a compact solution for various circuit implementation situations to meet demands for being lightweight and compact, such that they may be utilized in small electronic devices such as, for example, mobile phones.

Screen patterns include, for example, white/black/128G, Gradation, X-Talk, Gamma Worst Gray, etc. Particularly, a gradation pattern may show a glitch in a post-layout stage. To address the glitch, the size and the power consumption of a DDI may be increased. However, increasing the size and the power consumption of a DDI is counter to achieving a lightweight and compact MDDI.

SUMMARY

Exemplary embodiments of the present disclosure provide a display panel driving device that does not increase circuit size and that has improved reliability.

Exemplary embodiments of the present disclosure also provide a source driver that does not increase circuit size and that has improved reliability.

According to an exemplary embodiment, a display panel driving device includes a plurality of level shifters including a first level shifter and a second level shifter. A digital signal including a plurality of bits is input to the plurality of level shifters. The plurality of bits includes a most significant bit (MSB) and a first non-MSB. The first level shifter receives the MSB, and the second level shifter receives the first non-MSB. The first level shifter includes a first input terminal, a first output terminal via which a first signal input to the first input terminal is output, a second input terminal, and a second output terminal via which a second signal input to the second input terminal is output. The second level shifter includes a third input terminal, a third output terminal via which a third signal input to the third input terminal is output, a fourth input terminal, and a fourth output terminal via which a fourth signal input to the fourth input terminal is output. An inverted MSB is input to the first input terminal of the first level shifter, the MSB is input to the second input terminal of the first level shifter, the first non-MSB is input to the third input terminal of the second level shifter, an inverted first non-MSB is input to the fourth input terminal of the second level shifter.

According to an exemplary embodiment, a source driver includes a decoder to which a digital signal including a plurality of bits is input, in which the plurality of bits includes a most significant bit (MSB) and a first non-MSB. The source driver further includes a level shifter including a first input terminal, a first output terminal via which a first signal input to the first input terminal is output, a second input terminal, and a second output terminal via which a second signal input to the second input terminal is output. The decoder includes a first port to which the MSB is input, a second port to which an inverted MSB is input, a third port to which the first non-MSB is input, and a fourth port to which an inverted first non-MSB is input. The MSB is provided to the first port via the second input and output terminals of the level shifter, and the inverted MSB is provided to the second port via the first input and output terminals of the level shifter. The first non-MSB is provided to the third port via the first input and output terminals of the level shifter, and the inverted first non-MSB is provided to the fourth port via the second input and output terminals of the level shifter.

According to an exemplary embodiment, a display device includes a display panel including a plurality of pixels, a plurality of gate lines electrically connected to the pixels, a gate driver that provides a plurality of gate voltage signals to the pixels via the gate lines, a plurality of source lines electrically connected to the pixels, a source driver that provides a plurality of driving voltages to the pixels via the source lines, and a timing controller that provides a plurality of control signals to the source driver and the gate driver. The source driver includes a shift register that receives the control signals and a digital signal including a plurality of bits, and that outputs the digital signal in accordance with the control signals, in which the plurality of bits includes a most significant bit (MSB) and a first non-MSB. The source driver further includes a plurality of level shifters including a first level shifter provided with the MSB, and a second level shifter provided with the first non-MSB. The first level shifter includes a first input terminal, a first output terminal via which a first signal input to the first input terminal is output, a second input terminal, and a second output terminal via which a second signal input to the second input terminal is output. The second level shifter includes a third input terminal, a third output terminal via which a third signal input to the third input terminal is output, a fourth input terminal, and a fourth output terminal via which a fourth signal input to the fourth input terminal is output. An inverted MSB is input to the first input terminal of the first level shifter, the MSB is input to the second input terminal of the first level shifter, the first non-MSB is input to the third input terminal of the second level shifter, and an inverted first non-MSB is input to the fourth input terminal of the second level shifter.

BRIEF DESCRIPTION OF THE DRAWINGS

The above and other features of the present disclosure will become more apparent by describing in detail exemplary embodiments thereof with reference to the accompanying drawings, in which:

FIGS. 10 and 11 illustrate effects of the source driver of FIG. 4 according to exemplary embodiments of the present disclosure.

FIG. 13 illustrates effects of the source driver of FIG. 12 according to exemplary embodiments of the present disclosure.

DETAILED DESCRIPTION

Figure 1:
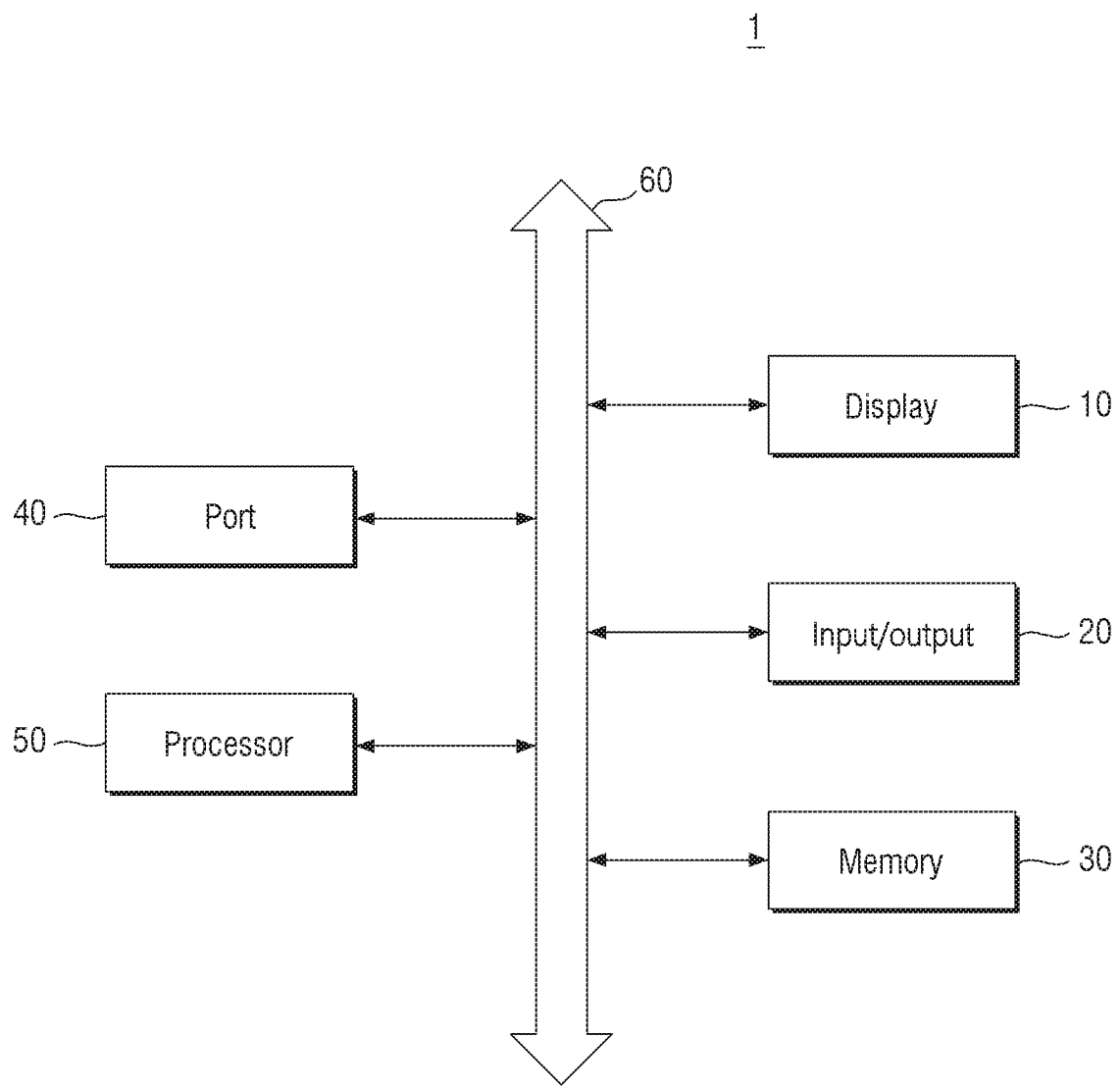
FIG. 1 is a block diagram of an electronic device including a display device according to exemplary embodiments of the present disclosure.

Exemplary embodiments of the present disclosure will be described more fully hereinafter with reference to the accompanying drawings. Like reference numerals may refer to like elements throughout the accompanying drawings.

FIG. 1 is a block diagram of an electronic device 1 including a display device 10 according to exemplary embodiments of the present disclosure.

Referring to FIG. 1, the electronic device 1 may include the display device 10, an input/output unit 20, a memory 30, a processor 40, and a port 50. Examples of the electronic device 1 may include a mobile device such as a smartphone, a tablet personal computer (PC), a laptop computer, a television (TV), a desktop computer, etc. The display device 10, the input/output unit 20, the memory 30, the processor 40, and the port 50 may communicate with one another via a bus 60.

The display device 10 may include a display driver and a display panel. The display driver may display image data transmitted by the processor 40 via the bus 60 on the display panel, depending on its operating mode. The display driver may generate a number of gamma voltages corresponding to the bit quantity of the image data transmitted by the processor 40, may select at least some of the gamma voltages based on the image data, and may input the selected gamma voltages to unit buffers.

In exemplary embodiments, two or more different gamma voltages may be input to the input ports of the unit buffers that output a predetermined range of gray voltages. The unit buffers can output gray voltages using an interpolation method, and can prevent the gray voltages from being displayed on the display panel with their brightnesses reversed.

Figure 2:
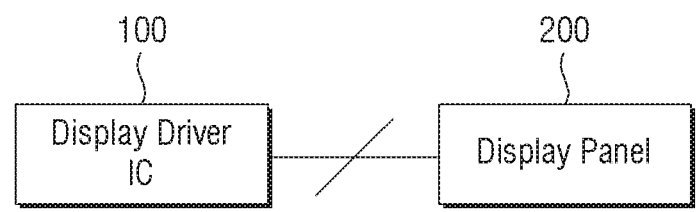
FIGS. 2 and 3 are block diagrams of a display device including a display driving device according to exemplary embodiments of the present disclosure.
Figure 3:
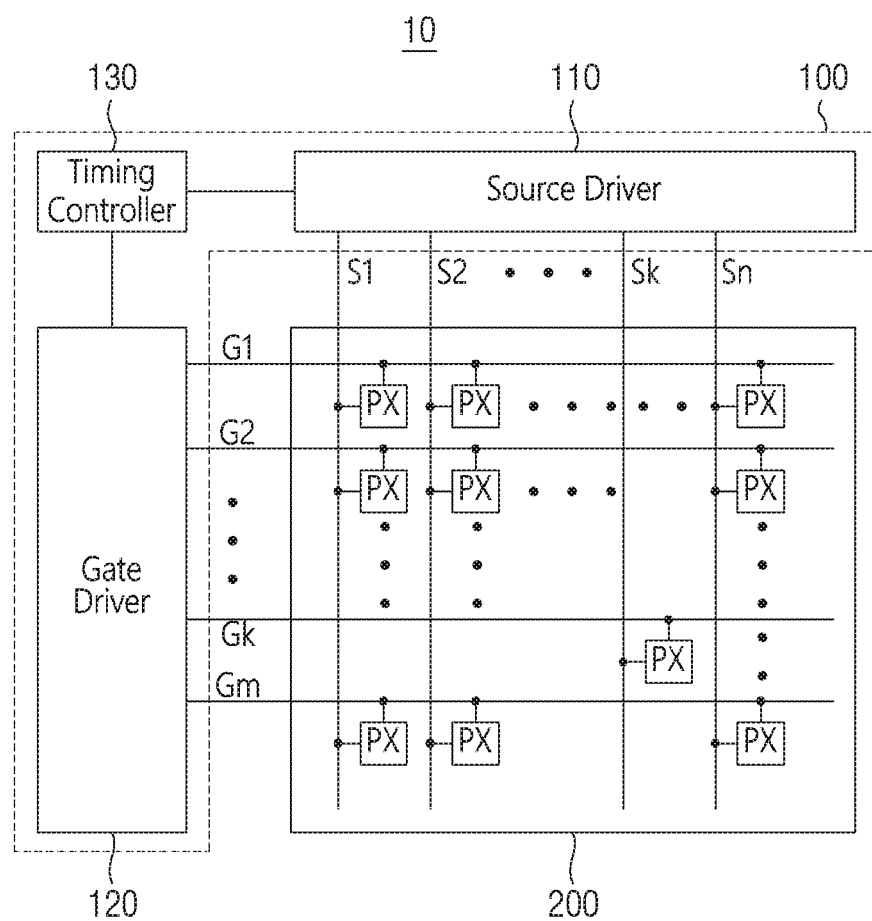

FIGS. 2 and 3 are block diagrams of the display device 10 including a display driving device 100 according to exemplary embodiments of the present disclosure.

Referring to FIGS. 2 and 3, the display device 10 may include the display driving device 100 (also referred to as a display driver integrated circuit (IC) or a display panel driving device) and a display panel 200. The display driving device 100 may include a gate driver and a source driver, which input image data received from, for example, an external processor, to the display panel 200, and a timing controller which controls the gate driver and the source driver. The timing controller may control the gate driver and the source driver in accordance with vertical and horizontal synchronization signals.

The processor that transmits the image data to the display driving device 100 may be, for example, an application processor (AP) (e.g., in the case of a mobile device) or a central processing unit (CPU) (e.g., in the case of a desktop or laptop computer or a TV). For example, the processor may be a processing device having a computing function. The processor may generate image data to be displayed by the display device 10, or may receive image data from a memory, a communication module, etc. and transmit the received image data to the display driving device 100.

The display driving device 100 may include a source driver 110, a gate driver 120, and a timing controller 130. The display panel 200 may include a plurality of gate lines (G1, . . . , Gk, . . . , and Gm) (in which k and m are positive integers), a plurality of source lines (S1, . . . , Sk, . . . , and Sn) (in which n is a positive integer), and a plurality of pixels PX arranged in a display pixel array and connected to the gate lines (G1, . . . , Gk, . . . , and Gm) and the source lines (S1, . . . , Sk, . . . , and Sn). The plurality of source lines (S1, . . . , Sk, . . . , and Sn) may also be referred to as a plurality of driving source lines, and an analog signal corresponding to digital image data may be output via the plurality of driving source lines. The gate driver 120 may provide a plurality of gate voltage signals to the pixels PX via the plurality of gate lines (G1, . . . , Gk, . . . , and Gm), and the source driver 110 may provide a plurality of driving voltages to the pixels PX via the plurality of source lines (S1, . . . , Sk, . . . , and Sn) The timing controller 130 may provide a plurality of control signals to the source driver 110 and the gate driver 120 to control operation of the source driver 110 and the gate driver 120.

The display device 10 may display an image in units of frames. The amount of time that it takes to display a single frame may be defined as a vertical period, and the vertical period may be determined by the frame frequency of the display device 10. For example, if the frame frequency of the display device 10 is 60 Hz, the vertical period may be 1/60 sec (e.g., about 16.7 msec).

In one vertical period, the gate driver 120 may scan each of the gate lines (G1, . . . , Gk, . . . , and Gm). The amount of time that it takes for the gate driver 120 to scan each of the gate lines (G1, . . . , Gk, . . . , and Gm) may be defined as a horizontal period, and in one horizontal period, the source driver 110 may input gray voltages to the pixels PX. The gray voltages may be voltages output by the source driver 110, and the brightnesses of the pixels PX may be determined by the gray voltages.

Figure 4:
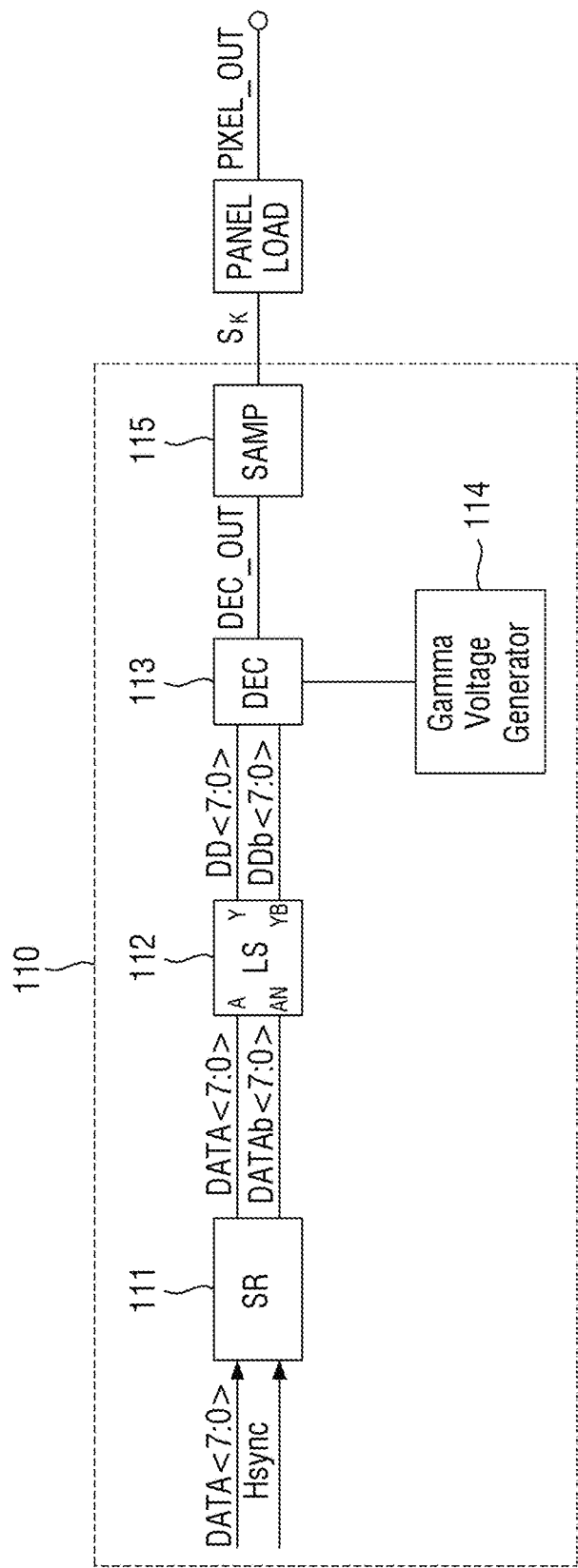
FIG. 4 is a block diagram of a source driver according to exemplary embodiments of the present disclosure.

FIG. 4 is a block diagram of the source driver 110 according to exemplary embodiments of the present disclosure.

Referring to FIG. 4, the source driver 110 may include a shift register 111, a level shifter 112, a decoder 113, a gamma voltage generator 114, and a source buffer unit 115. The source driver 110 may also be referred to as a source driver circuit.

The elements of the source driver 110 are not limited to those illustrated in FIG. 4, and may vary according to exemplary embodiments.

The shift register 111 may control the operation timings of a plurality of sampling circuits included in the level shifter 112 in accordance with a horizontal synchronization signal Hsync. The horizontal synchronization signal Hsync may be a signal having a predetermined period, and may determine the scan period of pixels in the display panel 200 that are connected to the gate lines (G1, . . . , Gk, . . . , and Gm). For example, the shift register 111 may be provided with control signals from the timing controller 130 and a digital signal including a plurality of bits, and may output the digital signal in accordance with the control signals, as described further below.

As will be described later, the level shifter 112 may level-shift image data in accordance with a predetermined shift sequence. The level shifter 112 may receive a low-voltage signal and may then be used to output high-voltage pulses to be input to the display panel. However, the present disclosure is not limited thereto. For example, the level shifter 112 may include a plurality of level shifters, as described below, and the plurality of level shifters may receive a digital signal including a plurality of bits.

In exemplary embodiments, the level shifter 112 may include a sampling circuit, which samples data, and a holding latch, which stores the data sampled by the sampling circuit.

After level-shifting the image data, the level shifter 112 may output decode image data DD to be decoded by the decoder 113. The decoder 113 may be, for example, a digital-to-analog converter (DAC) outputting an analog signal corresponding to digital image data.

Herein, the term "decode image data DD" may refer to encoded image data that is input to the decoder 113 to be decoded by the decoder 113. Thus, decode image data DD may also be referred to as encoded image data.

The decoder 113 may receive a plurality of gamma voltages VG together with the decode image data DD. The gamma voltages VG may be provided by the gamma voltage generator 114. The gamma voltage generator 114 may determine the number of gamma voltages VG based on the bit quantity of the decode image data DD, and may determine the levels of the gamma voltages VG based on the operating conditions or gamma voltage register settings of the display device 10.

The number of gamma voltages VG may be determined by the bit quantity of image data. For example, if the decode image data DD is 8-bit data, the number of gamma voltages VG may be 256 or less, and if the decode image data DD is 10-bit data, the number of gamma voltages VG may be 1024 or less. For example, if the decode image data DD is N-bit data, the gamma voltages VG may have $2^N$ different levels. The gamma voltage generator 114 may select at least some of a plurality of reference voltages and may determine the levels of the gamma voltages VG based on the selected reference voltages.

The source buffer unit 115 may include a plurality of source buffers, which may be implemented as operational amplifiers, and may be connected to a k-th source line Sk, which is one of a plurality of source lines (S1, . . . , Sk, . . . , and Sn) of the display panel. Each of the source buffers may include a plurality of input terminals.

The decoder 113 may select at least some of the gamma voltages VG based on the decode image data DD, and may transmit the selected gamma voltages VG to the source buffers as input via an output port. The source buffers may output the gamma voltages received from the decoder 113 to the display panel 200 as gray voltages, and may output gray voltages so that the gray voltages can be transmitted to the pixels PX via the source lines (S1, . . . , Sk, . . . , and Sn).

Figure 5:
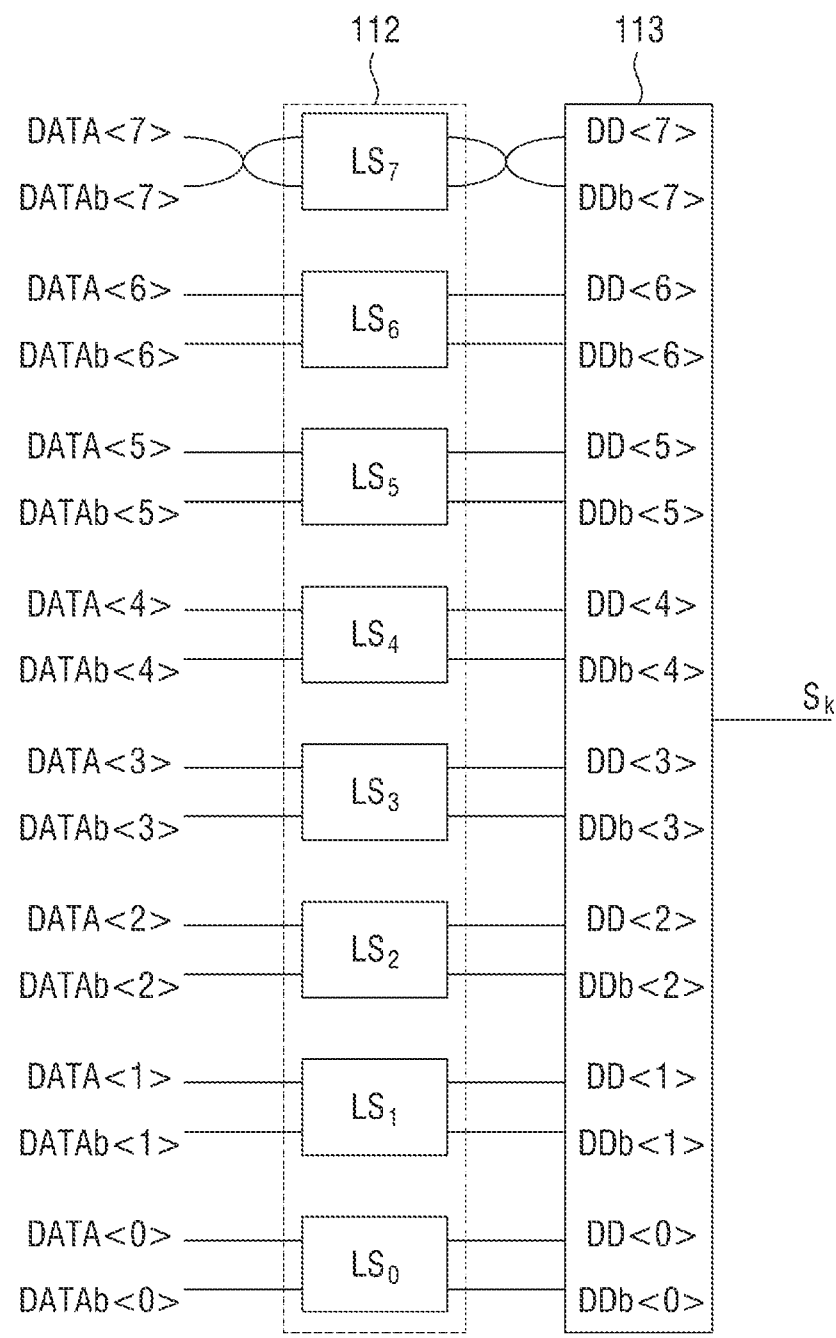
FIGS. 5 through 7 illustrate an operation of a level shifter included in the source driver of FIG. 4 according to exemplary embodiments of the present disclosure.
Figure 6:
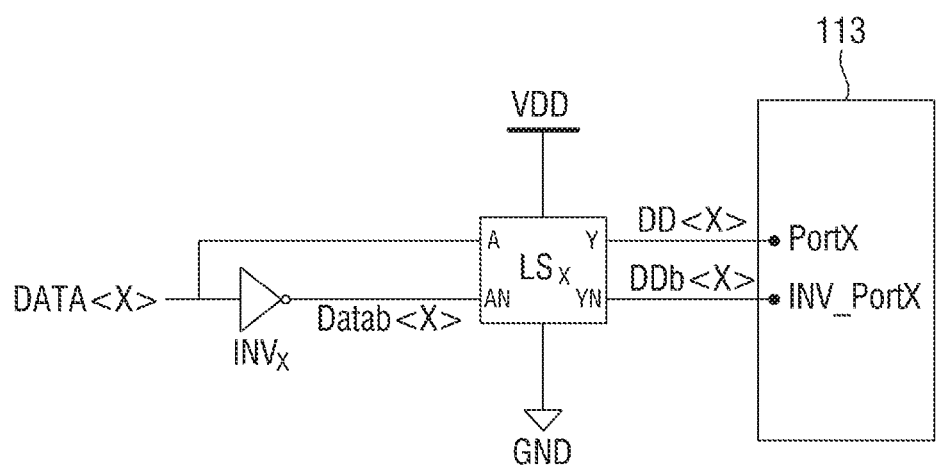
Figure 7:
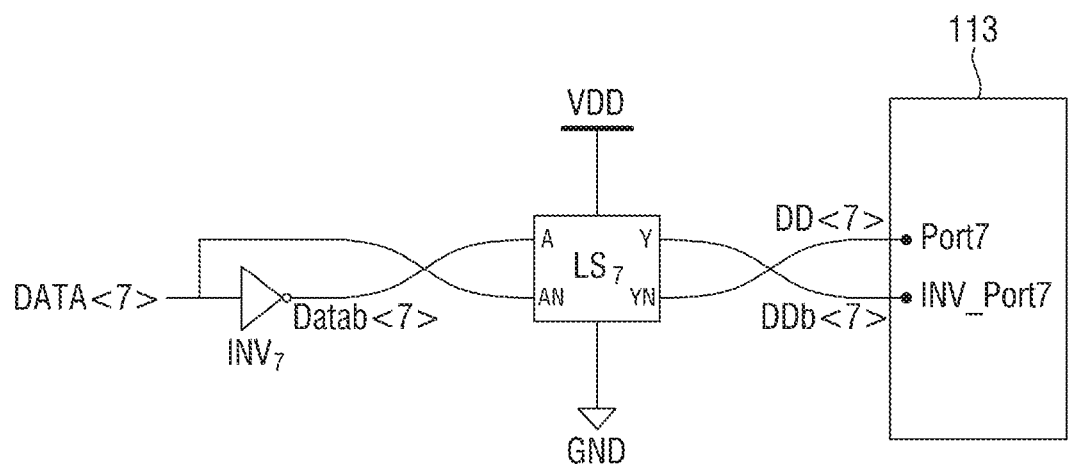

FIGS. 5 through 7 illustrate an operation of the level shifter 112 included in the source driver 110 of FIG. 4 according to exemplary embodiments of the present disclosure.

For convenience of description, image data will hereinafter be described as being 8-bit data. However, the present disclosure is not limited thereto.

Referring to FIGS. 5 through 7, the level shifter 112 may include a plurality of zeroth through seventh level shifter blocks $LS_0$ through $LS_7$. Each of the zeroth through seventh level shifter blocks $LS_0$ through $LS_7$ may include, for example, a voltage pull-up transistor, a voltage pull-down transistor, a capacitor, etc., but the present disclosure is not limited thereto. Each of the zeroth through seventh level shifter blocks $LS_0$ through $LS_7$ may also be referred to as a level shifter or a level shifter circuit.

The zeroth through seventh level shifter blocks $LS_0$ through $LS_7$ may receive zeroth through seventh image data bits DATA<0> through DATA<7>, respectively, and zeroth through seventh inverted image data bits DATAb<0> through DATAb<7>, respectively, of image data DATA<7:0>.

The seventh image data bit DATA<7> may be a most significant bit (MSB), the zeroth image data bit DATA<0> may be a least significant bit (LSB), and the sixth, fifth, fourth, third, second, and first image data bits DATA<6>, DATA<5>, DATA<4>, DATA<3>, DATA<2>, and DATA<1> may be consecutive bits arranged in order from the MSB to the LSB. The bits other than the MSB may be referred to as non-MSBs. For example, the seventh image data bit DATA<7> may be referred to as the MSB, and the sixth, fifth, fourth, third, second, first, and zeroth image data bits DATA<6>, DATA<5>, DATA<4>, DATA<3>, DATA<2>, DATA<1>, and DATA<0> may be referred to as non-MSBs. More specifically, the data bit DATA<6> may be referred to as a first non-MSB consecutive to the data bit <DATA>7, the data bit DATA<5> may be referred to as a second non-MSB consecutive to the data bit DATA<6>, the data bit DATA<4> may be referred to as a third non-MSB consecutive to the data bit DATA<5>, the data bit DATA<3> may be referred to as a fourth non-MSB consecutive to the data bit DATA<4>, the data bit DATA<2> may be referred to as a fifth non-MSB consecutive to the data bit DATA<3>, the data bit DATA<1> may be referred to as a sixth non-MSB consecutive to the data bit DATA <2>, and the data bit DATA<0> may be referred to as a seventh non-MSB consecutive to the data bit DATA<1>.

The decoder 113 may receive decode image data DD<7: 0> and inverted decode image data DDb<7:0>, which are level-shifted by the level shifter 112. Bits of the decode image data DD<7:0> and bits of the inverted decode image data DDb<7:0> may be separately input to the input ports of the decoder 113.

Referring to FIG. 6, an X-th level shifter block $LS_X$, which is one of the zeroth through sixth level shifter blocks $LS_0$ through $LS_6$, may include a first input terminal A, a second input terminal AN, a first output terminal Y, and a second output terminal YN.

The first input terminal A may receive an X-th image data bit DATA<X>, which is one of the zeroth through sixth image data bits DATA<0> through DATA<6>, and the second input terminal AN may receive an X-th inverted image data bit DATAb<X>.

For example, the X-th inverted image data bit DATAb<X> may be generated by inputting the X-th image data bit DATA<X> to an X-th inverter $INV_X$, but the present disclosure is not limited thereto.

A signal input to the first input terminal A may be output via the first output terminal Y, and a signal input to the second input terminal AN may be output via the second output terminal YN.

For example, the X-th image data bit DATA<X> may be provided to an X-th input port PortX of the decoder 113 via the first input and output terminals A and Y of the X-th level shifter block $LS_X$ (see DD<X> in FIG. 6), and the X-th inverted image data bit DATAb<X> may be provided to an X-th inverted input port INV_PortX of the decoder 113 via the second input and output terminals AN and YN of the X-th level shifter block $LS_X$ (see DDb<X> in FIG. 6).

The X-th level shifter block $LS_X$ may be connected to a power supply input terminal VDD and a ground terminal GND. A voltage applied to the power supply input terminal VDD may be, for example, about 7.5 V or about 5 V, but the present disclosure is not limited thereto.

Referring to FIG. 7, the seventh level shifter block $LS_7$ may include a first input terminal A, a second input terminal AN, a first output terminal Y, and a second output terminal YN, and may have the same configuration as the X-th level shifter block $LS_X$ described with reference to FIG. 6.

The first input terminal A of the seventh level shifter block $LS_7$ may receive the seventh inverted image data bit DATAb<7>, and the second input terminal AN of the seventh level shifter block $LS_7$ may receive the seventh image data bit DATA<7>.

For example, the seventh inverted image data bit DATAb<7> may be generated by inputting the seventh image data bit DATA<7> to a seventh inverter $INV_7$, but the present disclosure is not limited thereto.

In the seventh level shifter block $LS_7$, like in the X-th level shifter block $LS_X$, a signal input to the first input terminal A may be output via the first output terminal Y, and a signal input to the second input terminal AN may be output via the second input terminal YN.

For example, the seventh image data bit DATA<7> may be provided to a seventh input port Port7 of the decoder 113 via the second input and output terminals AN and YN of the seventh level shifter block $LS_7$ (see DD<7> in FIG. 7), and the seventh inverted image data bit DATAb<7> may be provided to a seventh inverted input port INV_Port7 of the decoder 113 via the first input and output terminals A and Y of the seventh level shifter block $LS_7$ (see DDb<7> in FIG. 7). Unlike the X-th level shifter block $LS_X$, the seventh level shifter block $LS_7$ has its input and output signals and inverted input and output signals swapped.

The seventh level shifter block $LS_7$, like the X-th level shifter block $LS_X$, may be connected to the power supply input terminal VDD and the ground terminal GND.

Figure 8:
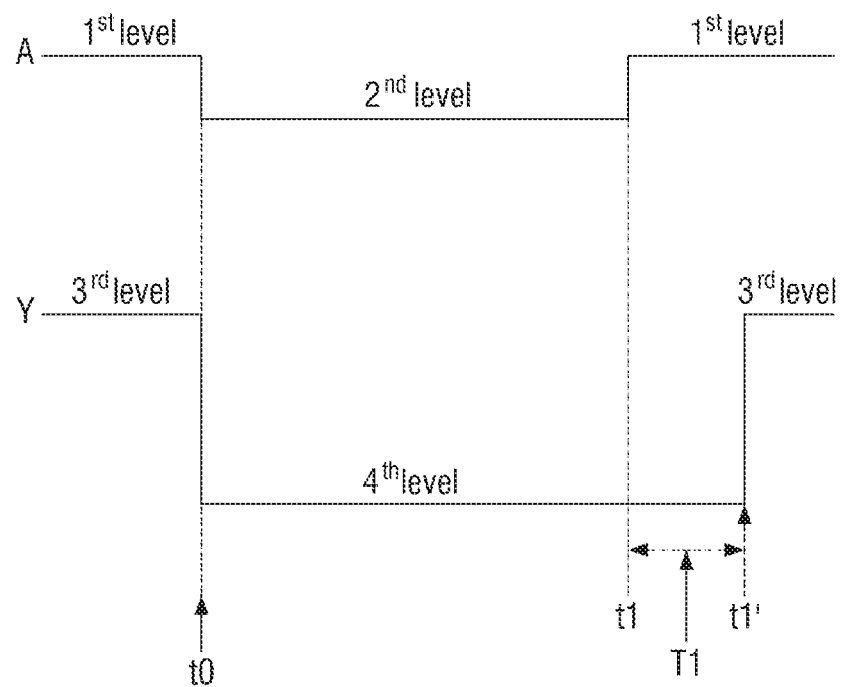
FIGS. 8 and 9 are graphs illustrating an operation of the source driver of FIG. 4 according to exemplary embodiments of the present disclosure.
Figure 9:
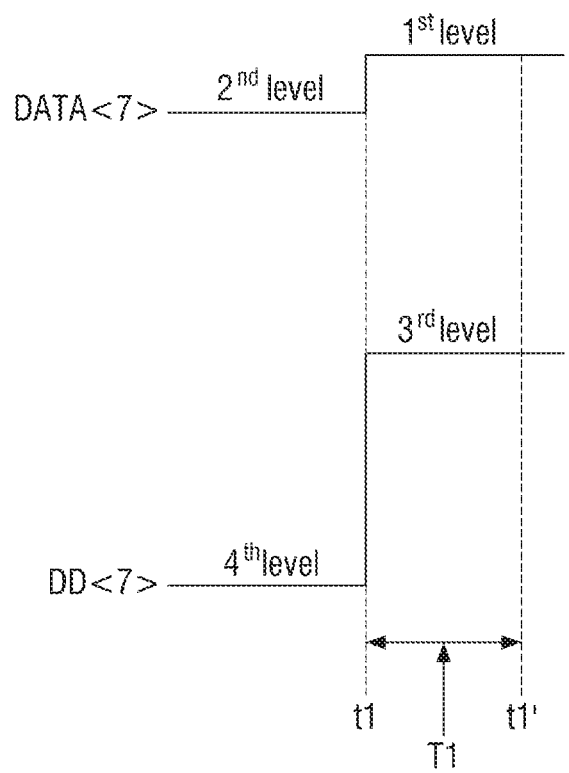

FIGS. 8 and 9 are graphs illustrating an operation of the source driver 110 of FIG. 4 according to exemplary embodiments of the present disclosure.

Referring to FIGS. 6 through 9, signals input to, or output from, the level shifter 112 may be square waves. As will be described later, the levels of signals input to, or output from, the level shifter 112 may be affected by voltages from the power supply input terminal VDD and the ground terminal GND that are applied to the level shifter 112.

In a case in which signals input to the first input terminals A of the zeroth through seventh level shifter blocks $LS_0$ through $LS_7$ are switched from a first level to a second level at a time t0, signals output from the second output terminals Y of the zeroth through seventh level shifter blocks $LS_0$ through $LS_7$ may be switched from a third level to a fourth level with no delay, or with a much shorter delay than a period T1.

For example, in a case in which the signals input to the first input terminals A of the zeroth through seventh level shifter blocks $LS_0$ through $LS_7$ are switched from a high level to a low level, the signals output from the second output terminals Y of the zeroth through seventh level shifter blocks $LS_0$ through $LS_7$ may be switched from a high level to a low level with no delay, or with a much shorter delay than the period T1.

Third-level signals may be signals provided by the power supply input terminal VDD and as a result, the third level may be the same as the level of the voltage from the power supply input terminal VDD.

The first level may be about 1 V, and the third level may be about 7.5 V or about 5 V. However, the present disclosure is not limited thereto.

The second and fourth levels may be lower than the first and third levels, respectively, and may correspond to the voltage from the ground terminal GND. However, the present disclosure is not limited thereto.

In a case in which the signals input to the first input terminals A of the zeroth through seventh level shifter blocks $LS_0$ through $LS_7$ are switched from the second level to the first level at a time t1, the signals output from the second output terminals Y of the zeroth through seventh level shifter blocks $LS_0$ through $LS_7$ may be switched from the fourth level to the third level at a time t1'.

For example, in a case in which the signals input to the first input terminals A of the zeroth through seventh level shifter blocks $LS_0$ through $LS_7$ are switched from a low level to a high level, the signals output from the second output terminals Y of the zeroth through seventh level shifter blocks $LS_0$ through $LS_7$ may be switched from a low level to a high level after the period T1, which is between the time t1 and the time t1'.

Delays in the signals output from the zeroth through seventh level shifter blocks $LS_0$ through $LS_7$ may vary depending on whether the signals input to the zeroth through seventh level shifter blocks $LS_0$ through $LS_7$ are switched from a high level to a low level or from a low level to a high level.

Referring to FIG. 9, the level shifter 112 may receive the seventh image data bit DATA<7> and may output a seventh decode image data bit DD<7>, which is to be provided to the seventh input port Port7 of the decoder 113.

In a case in which the seventh image data bit DATA<7> is switched from the second level to the first level at the time t1, the seventh decode image data bit DD<7> may be switched from the fourth level to the third level with no delay, or with a much shorter delay than the period T1.

According to exemplary embodiments, in a case in which the seventh image data bit DATA<7> is switched from the first level to the second level at the time t1, the seventh decode image data bit DD<7> may be switched from the third level to the fourth level after the period T1.

Figure 11:
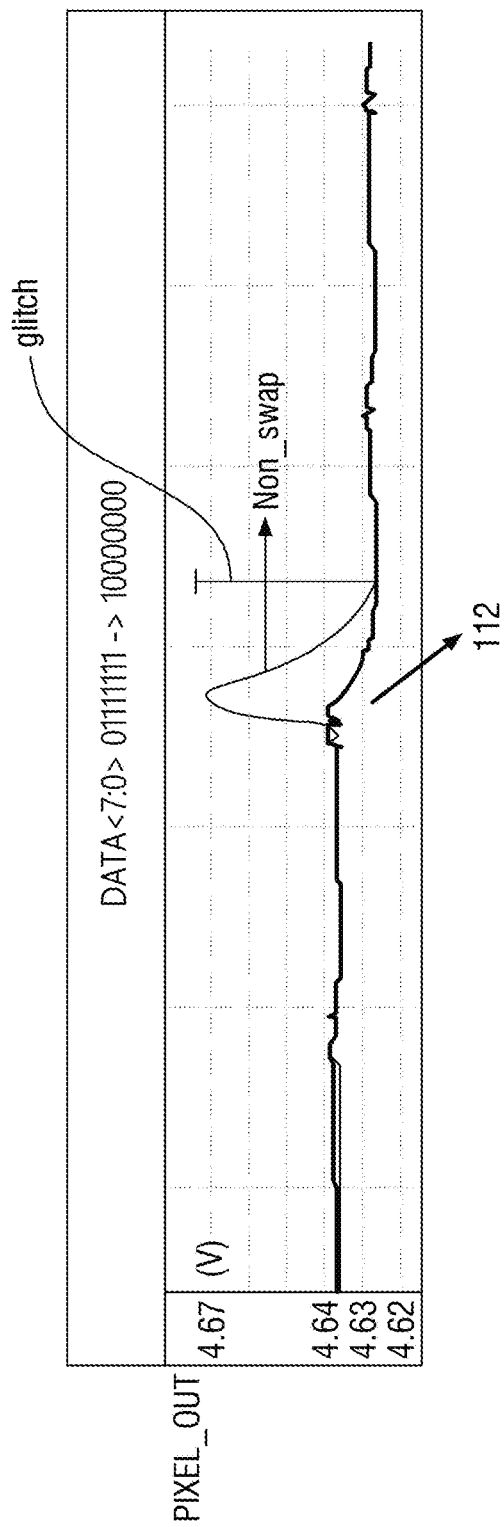

FIGS. 10 and 11 illustrate effects of the source driver of FIG. 4 according to exemplary embodiments of the present disclosure.

Referring to FIGS. 10 and 11, in a case in which the MSB of the image data DATA<7:0> and the non-MSBs of the image data DATA<7:0> are 0 and 1, respectively, before the time t1, and are 1 and 0, respectively, after the time t1, the MSB of the decode image data DD<7:0> and the non-MSBs of the decode image data DD<7:0> may be simultaneously switched from 0 to 1 and from 1 to 0, respectively, as shown in the top left portion of FIG. 10.

For example, if decimal data of the image data DATA<7:0> is changed from 127 to 128, the decode image data DD<7:0> may also be changed from 127 to 128.

In a case in which the input and output signals and inverted input and output signals of the seventh level shifter block $LS_7$ are not swapped, the decimal data of the decode image data DD<7:0> may represent 0 during the period T1 in response to the decimal data of the image data DATA<7:0> being changed from 127 to 128 at the time t1. Thus, the decimal data of the decode image data DD<7:0>, which is input to the decoder 113, may be changed from 127 to 0 during the period T1 and may be changed to 128 after the time t1', as shown in the bottom left portion of FIG. 10. Accordingly, a glitch may occur in a pixel output voltage PIXEL_OUT of FIG. 4, as illustrated in FIG. 11.

Similarly, in a case in which the MSB of the image data DATA<7:0> and the non-MSBs of the image data DATA<7:0> are 1 and 0, respectively, before the time t1, and are 0 and 1, respectively, after the time t1, the MSB of the decode image data DD<7:0> and the non-MSBs of the decode image data DD<7:0> may be simultaneously switched from 1 to 0 and from 0 to 1, respectively, as shown in the upper right portion of FIG. 10.

For example, if the decimal data of the image data DATA<7:0> is changed from 128 to 127, the decode image data DD<7:0> may also be changed from 128 to 127.

In a case in which the input and output signals and inverted input and output signals of the seventh level shifter block $LS_7$ are not swapped, the decimal data of the decode image data DD<7:0> may represent 0 during the period T1 in response to the decimal data of the image data DATA<7:0> being changed from 128 to 127 at the time t1. Thus, the decimal data of the decode image data DD<7:0>, which is input to the decoder 113, may be changed from 128 to 0 during the period T1 and may be changed to 127 after the time t1', as shown in the bottom right portion of FIG. 10. Accordingly, a glitch may occur in the pixel output voltage PIXEL_OUT.

Figure 12:
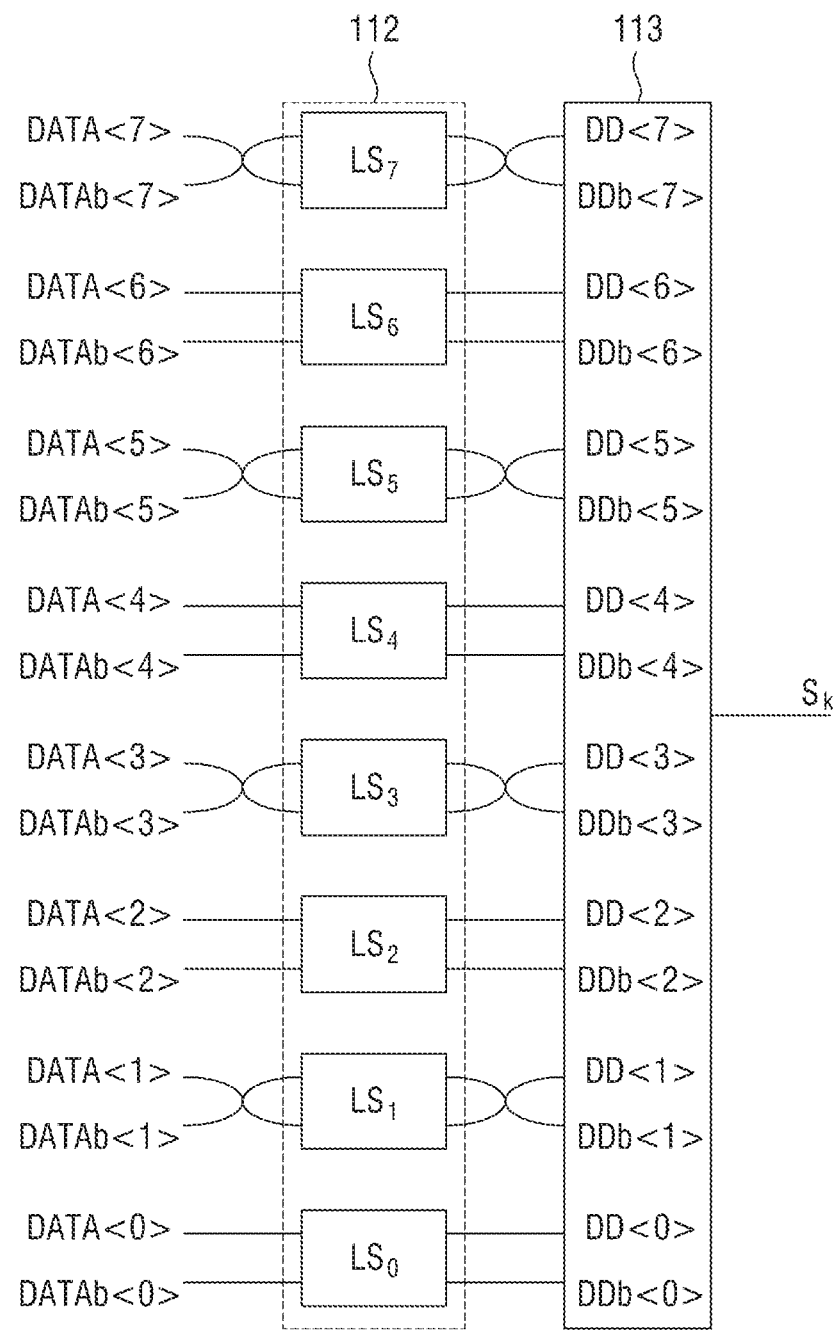
FIG. 12 illustrates a level shifter included in a source driver according to exemplary embodiments of the present disclosure.

FIG. 12 illustrates a level shifter included in a source driver according to exemplary embodiments of the present disclosure.

A source driver according to exemplary embodiments of the present disclosure will hereinafter be described, with the focus being mainly on the differences relative to the source driver of FIGS. 5 through 7.

In FIGS. 5 through 7 and 12, like reference numerals indicate like elements, and thus, a further detailed description thereof will be omitted.

A level shifter 112 may include a plurality of zeroth through seventh level shifter blocks $LS_0$ through $LS_7$. Odd-numbered level shifter blocks, e.g., the seventh, fifth, third, and first level shifter blocks $LS_7$, $LS_5$, $LS_3$, and $LS_1$, may have their input and output signals and inverted input and output signals swapped.

For example, odd-numbered image data bits of image data DATA<7:0>, e.g., seventh, fifth, third, and first image data bits DATA<7>, DATA<5>, DATA<3>, and DATA<1>, may be provided to seventh, fifth, third, and first input ports Port7, Port5, Port3, and Port1, respectively, of a decoder 113 via second input terminals AN and second output terminals YN of the seventh, fifth, third, and first level shifter blocks $LS_7$, $LS_5$, $LS_3$, and $LS_1$, respectively. In addition, odd-numbered inverted image data bits, e.g., seventh, fifth, third, and first inverted image data bits DATAb<7>, DATAb<5>, DATAb<3>, and DATAb<1>, may be provided to seventh, fifth, third, and first inverted input ports INV_Port7, INV_Port5, INV_Port3, and INV_Port1, respectively, of the decoder 113 via first input terminals A and first output terminals Y of the seventh, fifth, third, and first level shifter blocks $LS_7$, $LS_5$, $LS_3$, and $LS_1$, respectively.

FIG. 13 illustrates effects of the source driver of FIG. 12 according to exemplary embodiments of the present disclosure.

Referring to FIG. 13, in a case ("Ref") in which all of the zeroth through seventh level shifter blocks $LS_0$ through $LS_7$ do not have their input and output signals and inverted input and output signals swapped, the glitch described above may be about 53 mV when decimal data of the image data DATA<7:0> is changed from 127 to 128, about 37 mV when decimal data of the image data DATA<7:0> is changed from 128 to 127, about 43 mV when the decimal data of the image data DATA<7:0> is changed from 63 to 64, and about 7 mV when the decimal data of the image data DATA<7:0> is changed from 64 to 63. In this case, a maximum glitch MAX may be about 53 mV, and an average glitch AVG may be about 35 mV.

In a case ("Case-7") in which the seventh level shifter block $LS_7$ has its input and output signals and inverted input and output signals swapped, the glitch described above may be about 0 mV when the decimal data of the image data DATA<7:0> is changed from 127 to 128, about 21 mV when the decimal data of the image data DATA<7:0> is changed from 128 to 127, about 43 mV when the decimal data of the image data DATA<7:0> is changed from 63 to 64, and about 7 mV when the decimal data of the image data DATA<7:0> is changed from 64 to 63. In this case, the maximum glitch MAX may be about 43 mV, and the average glitch AVG may be about 18 mV.

In a case ("Case-75") where the seventh and fifth level shifter blocks $LS_7$ and $LS_5$ have their input and output signals and inverted input and output signals swapped, the glitch described above may be about 7 mV when the decimal data of the image data DATA<7:0> is changed from 127 to 128, about 17 mV when the decimal data of the image data DATA<7:0> is changed from 128 to 127, about 29 mV when the decimal data of the image data DATA<7:0> is changed from 63 to 64, and about 0 mV when the decimal data of the image data DATA<7:0> is changed from 64 to 63. In this case, the maximum glitch MAX may be about 29 mV, and the average glitch AVG may be about 13 mV.

In a case ("Case-753") in which the seventh, fifth, and third level shifter blocks $LS_7$, $LS_5$, and $LS_3$ have their input and output signals and inverted input and output signals swapped, the glitch described above may be about 7 mV when the decimal data of the image data DATA<7:0> is changed from 127 to 128, about 19 mV when the decimal data of the image data DATA<7:0> is changed from 128 to 127, about 23 mV when the decimal data of the image data DATA<7:0> is changed from 63 to 64, and about 0 mV when the decimal data of the image data DATA<7:0> is changed from 64 to 63. In this case, the maximum glitch MAX may be about 23 mV, and the average glitch AVG may be about 12 mV.

In a case ("Case-7531") in which all of the odd-numbered level shifter blocks, e.g., the seventh, fifth, third, and first level shifter blocks $LS_7$, $LS_5$, $LS_3$, and $LS_1$, have their input and output signals and inverted input and output signals swapped, the glitch described above may be about 7 mV when the decimal data of the image data DATA<7:0> is changed from 127 to 128, about 19 mV when the decimal data of the image data DATA<7:0> is changed from 128 to 127, about 23 mV when the decimal data of the image data DATA<7:0> is changed from 63 to 64, and about 0 mV when the decimal data of the image data DATA<7:0> is changed from 64 to 63. In this case, the maximum glitch MAX may be about 23 mV, and the average glitch AVG may be about 12 mV.

It is noted that the maximum glitch MAX and the average glitch "AVD" are smaller in "Case-7531" than in "Case-7", and that the glitch is greater in "Case-7531" than in "Case-7" when the decimal data of the image data DATA<7:0> is changed from 127 to 128.

According to exemplary embodiments of the present disclosure, the level shifter 112 can reduce a glitch without changing the configuration of circuitry or adding circuitry, when image data is sequentially changed due to the change of input and output lines. As a result, instant malfunction of gray voltages can be prevented or reduced.

If a glitch is generated when Gray Gradation in which display image data continually changes is performed, the reliability of a DDI may decrease. However, by using the level shifter 112 according to exemplary embodiments of the present disclosure, the reliability of a DDI can be improved while maintaining the compact size of a DDI.

As is traditional in the field of the present disclosure, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A display panel driving device, comprising:
a plurality of level shifters including a first level shifter and a second level shifter,
wherein
a digital signal including a plurality of bits is input to the plurality of level shifters,
the plurality of bits includes a most significant bit (MSB) and a first non-MSB,
the first level shifter receives the MSB, and the second level shifter receives the first non-MSB,
the first level shifter includes a first input terminal, a first output terminal via which a first signal input to the first input terminal is output, a second input terminal different from the first input terminal, and a second output terminal via which a second signal input to the second input terminal is output,
the second level shifter includes a third input terminal, a third output terminal via which a third signal input to the third input terminal is output, a fourth input terminal different from the third input terminal, and a fourth output terminal via which a fourth signal input to the fourth input terminal is output,
the first level shifter and the second level shifter have a same configuration in which the first input terminal of the first level shifter corresponds to the third input terminal of the second level shifter, and the second input terminal of the first level shifter corresponds to the fourth input terminal of the second level shifter,
an inverted MSB is input to the first input terminal of the first level shifter,
the MSB is input to the second input terminal of the first level shifter,
the first non-MSB is input to the third input terminal of the second level shifter, and
an inverted first non-MSB is input to the fourth input terminal of the second level shifter.

2. The display panel driving device of claim 1, further comprising:
a decoder that receives the digital signal via the plurality of level shifters,
wherein
the decoder includes a first port to which the MSB is input, a second port to which the inverted MSB is input, a third port to which the first non-MSB is input, and a fourth port to which the inverted first non-MSB is input,
the MSB is provided to the first port via the second input and output terminals of the first level shifter,
the inverted MSB is provided to the second port via the first input and output terminals of the first level shifter,
the first non-MSB is provided to the third port via the third input and output terminals of the second level shifter, and
the inverted first non-MSB is provided to the fourth port via the fourth input and output terminals of the second level shifter.

3. The display panel driving device of claim 2, wherein the first non-MSB is consecutive to the MSB,
the digital signal further includes a second non-MSB consecutive to the first non-MSB,
the plurality of level shifters further includes a third level shifter, which is provided with the second non-MSB,
the third level shifter includes a fifth input terminal, a fifth output terminal via which a fifth signal input to the fifth input terminal is output, a sixth input terminal, and a sixth output terminal via which a sixth signal input to the sixth input terminal is output,
the decoder further includes a fifth port to which the second non-MS B is input, and a sixth port to which an inverted second non-MSB is input,
the second non-MSB is provided to the fifth port via the fifth input terminal and the fifth output terminal of the third level shifter, and
the inverted second non-MSB is provided to the sixth port via the sixth input terminal and the sixth output terminal of the third level shifter.

4. The display panel driving device of claim 2, wherein the first non-MSB is consecutive to the MSB,
the digital signal further includes a second non-MSB consecutive to the first non-MSB,
the plurality of level shifters further includes a third level shifter, which is provided with the second non-MSB,
the third level shifter includes a fifth input terminal, a fifth output terminal via which a fifth signal input to the fifth input terminal is output, a sixth input terminal, and a sixth output terminal via which a sixth signal input to the sixth input terminal is output,
the decoder further includes a fifth port to which the second non-MS B is input, and a sixth port to which an inverted second non-MSB is input,
the second non-MSB is provided to the fifth port via the sixth input and output terminals of the third level shifter, and
the inverted second non-MSB is provided to the sixth port via the fifth input and output terminals of the third level shifter.

5. The display panel driving device of claim 1, further comprising:
a decoder that receives the digital signal via the plurality of level shifters,
wherein the decoder includes a first port to which the MSB is input, a second port to which the inverted MSB is input, a third port to which the first non-MSB is input, a fourth port to which the inverted first non-MSB is input, and an output port via which an analog signal is output based on the digital signal.

6. The display panel driving device of claim 5, further comprising:
a plurality of source lines,
wherein the output port is electrically connected to one of the plurality of source lines.

7. The display panel driving device of claim 5, wherein the decoder is connected to a gamma voltage generator, which outputs a plurality of gamma voltages.

8. The display panel driving device of claim 7, wherein the decoder selects one of the plurality of gamma voltages and outputs the analog signal.

9. The display panel driving device of claim 1, further comprising:
a first inverter; and
a second inverter,
wherein
the first inverter is provided with the MSB and outputs the inverted MSB to the first input terminal of the first level shifter, and
the second inverter is provided with the first non-MSB and outputs the inverted first non-MSB to the fourth input terminal of the second level shifter.

10. A source driver, comprising:
a decoder to which a digital signal including a plurality of bits is input, the plurality of bits including a most significant bit (MSB) and a first non-MSB; and
a first level shifter including a first input terminal, a first output terminal via which a first signal input to the first input terminal is output, a second input terminal different from the first input terminal, and a second output terminal via which a second signal input to the second input terminal is output,
a second level shifter including a third input terminal, a third output terminal via which a third signal input to the third input terminal is output, a fourth input terminal different from the third input terminal, and a fourth output terminal via which a fourth signal input to the fourth input terminal is output,
wherein
the decoder includes a first port to which the MSB is input, a second port to which an inverted MSB is input, a third port to which the first non-MSB is input, and a fourth port to which an inverted first non-MSB is input,
the first level shifter and the second level shifter have a same configuration in which the first input terminal of the first level shifter corresponds to the third input terminal of the second level shifter, and the second input terminal of the first level shifter corresponds to the fourth input terminal of the second level shifter,
the MSB is provided to the first port via the second input and output terminals of the first level shifter,
the inverted MSB is provided to the second port via the first input and output terminals of the first level shifter,
the first non-MSB is provided to the third port via the third input and output terminals of the second level shifter, and the inverted first non-MSB is provided to the fourth port via the fourth input and output terminals of the second level shifter.

11. The source driver of claim 10, wherein
the first non-MSB is consecutive to the MSB,
the digital signal further includes a second non-MSB consecutive to the first non-MSB,
the decoder further includes a fifth port to which the second non-MSB is input, and a sixth port to which an inverted second non-MSB is input,
the second non-MSB is provided to the fifth port via a third level shifter, and
the inverted second non-MSB is provided to the sixth port via the third level shifter.

12. The source driver of claim 10, further comprising:
a gamma voltage generator that outputs a plurality of gamma voltages,
wherein the decoder is connected to the gamma voltage generator, selects one of the plurality of gamma voltages, and outputs an analog signal.

13. The source driver of claim 12, wherein the decoder is connected to a driving source line which is connected to pixels in a display pixel array, and outputs the analog signal via the driving source line.

14. The source driver of claim 10, further comprising:
a first inverter; and
a second inverter,
wherein
the first inverter is provided with the MSB and outputs the inverted MSB to the first input terminal of the first level shifter, and
the second inverter is provided with the first non-MSB and outputs the inverted first non-MSB to the fourth input terminal of the second level shifter.

15. A display device, comprising:
a display panel including a plurality of pixels;
a plurality of gate lines electrically connected to the pixels;
a gate driver that provides a plurality of gate voltage signals to the pixels via the gate lines;
a plurality of source lines electrically connected to the pixels;
a source driver that provides a plurality of driving voltages to the pixels via the source lines; and
a timing controller that provides a plurality of control signals to the source driver and the gate driver,
wherein the source driver comprises:
a shift register that receives the control signals and a digital signal including a plurality of bits, and that outputs the digital signal in accordance with the control signals,
wherein the plurality of bits includes a most significant bit (MSB) and a first non-MSB; and
a plurality of level shifters including a first level shifter provided with the MSB, and a second level shifter provided with the first non-MSB,
wherein
the first level shifter includes a first input terminal, a first output terminal via which a first signal input to the first input terminal is output, a second input terminal different from the first input terminal, and a second output terminal via which a second signal input to the second input terminal is output,
the second level shifter includes a third input terminal, a third output terminal via which a third signal input to the third input terminal is output, a fourth input terminal different from the third input terminal, and a fourth output terminal via which a fourth signal input to the fourth input terminal is output, the first level shifter and the second level shifter have a same configuration in which the first input terminal of the first level shifter corresponds to the third input terminal of the second level shifter, and the second input terminal of the first level shifter corresponds to the fourth input terminal of the second level shifter, an inverted MSB is input to the first input terminal of the first level shifter, the MSB is input to the second input terminal of the first level shifter, the first non-MSB is input to the third input terminal of the second level shifter, and an inverted first non-MSB is input to the fourth input terminal of the second level shifter.

16. The display device of claim 15, wherein the source driver further comprises a decoder, which is provided with the digital signal via the plurality of level shifters, the decoder includes a first port to which the MSB is input, a second port to which the inverted MSB is input, a third port to which the first non-MSB is input, and a fourth port to which the inverted first non-MSB is input, the MSB is provided to the first port via the second input and output terminals of the first level shifter, the inverted MSB is provided to the second port via the first input and output terminals of the first level shifter, the first non-MSB is provided to the third port via the third input and output terminals of the second level shifter, and the inverted first non-MSB is provided to the fourth port via the fourth input and output terminals of the second level shifter.

17. The display device of claim 16, wherein the first non-MSB is consecutive to the MSB, the digital signal further includes a second non-MSB consecutive to the first non-MSB, the plurality of level shifters further includes a third level shifter, which is provided with the second non-MSB, the third level shifter includes a fifth input terminal, a fifth output terminal via which a fifth signal input to the fifth input terminal is output, a sixth input terminal, and a sixth output terminal via which a sixth signal input to the sixth input terminal is output, the decoder further includes a fifth port to which the second non-MS B is input, and a sixth port to which an inverted second non-MSB is input, the second non-MSB is provided to the fifth port via the fifth input and output terminals of the third level shifter, and the inverted second non-MSB is provided to the sixth port via the sixth input and output terminals of the third level shifter.

18. The display device of claim 16, wherein the first non-MSB is consecutive to the MSB, the digital signal further includes a second non-MSB consecutive to the first non-MSB, the plurality of level shifters further includes a third level shifter, which is provided with the second non-MSB, the third level shifter includes a fifth input terminal, a fifth output terminal via which a fifth signal input to the fifth input terminal is output, a sixth input terminal, and a sixth output terminal via which a sixth signal input to the sixth input terminal is output, the decoder further includes a fifth port to which the second non-MS B is input, and a sixth port to which an inverted second non-MSB is input, the second non-MSB is provided to the fifth port via the sixth input and output terminals of the third level shifter, and the inverted second non-MSB is provided to the sixth port via the fifth input and output terminals of the third level shifter.

19. The display device of claim 16, further comprising:

a gamma voltage generator that outputs a plurality of gamma voltages, wherein the decoder receives the digital signal and the plurality of gamma voltages, selects one of the plurality of gamma voltages, and outputs an analog signal.

* * * * *